(12) United States Patent
Odell (10) Patent No.: US 7,756,319 B2
(45) Date of Patent: Jul. 13, 2010

(54) OPTICAL SYSTEM FOR DETERMINING THE ANGULAR POSITION OF A RADIATING POINT SOURCE AND METHOD OF EMPLOYING

(75) Inventor: Don Odell, Milton, VT (US)

(73) Assignee: Ascension Technology Corporation

( * ) Notice: Subject to any disclaimer, the term of this patent is extended or adjusted under 35 U.S.C. 154(b) by 1162 days.

(21) Appl. No.: 11/369,988

(22) Filed: Mar. 8, 2006

(65) Prior Publication Data

US 2006/0165312 A1    Jul. 27, 2006

Related U.S. Application Data

(63) Continuation-in-part of application No. 10/073,335, filed on Feb. 13, 2002, now Pat. No. 7,027,634.

(51) Int. Cl.
*G06K 9/00*    (2006.01)
(52) U.S. Cl. ........................ 382/144; 382/145
(58) Field of Classification Search ............... 382/144, 382/145; 356/237.2–237.5
See application file for complete search history.

(56) References Cited

U.S. PATENT DOCUMENTS

| 4,193,689 A | 3/1980 | Reymond et al. |
| 4,209,780 A | 6/1980 | Fenimore et al. |
| 4,314,761 A | 2/1982 | Reymond et al. |
| 4,389,633 A | 6/1983 | Fenimore |
| 4,435,838 A | 3/1984 | Gourlay |
| 5,408,323 A | 4/1995 | Mitchelson |
| 5,640,241 A * | 6/1997 | Ogawa ...................... 356/615 |
| 6,141,104 A | 10/2000 | Schulz et al. |
| 6,457,169 B1 * | 9/2002 | Ross .......................... 716/21 |

* cited by examiner

*Primary Examiner*—Wes Tucker
(74) *Attorney, Agent, or Firm*—H. Jay Spiegel (57) ABSTRACT

An optical system for determining the angular position of a radiating point source is disclosed, wherein radiation from a point source travels through a mask and onto the surface of a sensor. A preferred embodiment employs a plurality of mask transmission frequencies and a detector designed to be sensitive to the phases of the frequencies. A computer measures the phases of a plurality of detected image frequencies. Measurement of the particular phases of the frequency components allows determination of the image shift on the detector axis. The image shift is then used to compute angle of incidence of the light source upon the detector. The preferred embodiment employs a refractive window, hence the angle of incidence between point radiating source and mask are determined using the window index of refraction and refraction equations. Applications include within the cockpit of a jet aircraft.

32 Claims, 12 Drawing Sheets

Figure 8. Fo, 5F0, and 25F0 phase outputs.

Figure 9. Sine and cosine correlating functions.

Figure 12. Reduced size two dimensional camera drawings.

Figure 13. Two-dimensional phasorBIRD mask (top view).

Figure 14. Two-dimensional phasorBIRD detector substrate (top view).

Figure 15. Sun, canopy and optical helmet tracking system.

Figure 16. F16 Canopy transmissivity.

Figure 17. Solar Irradiance (AM0).

Figure 18. Canopy AM0 irradiance.

Figure 19. Canopy transmission, UV filter transmission, and combined transmission.

OPTICAL SYSTEM FOR DETERMINING THE ANGULAR POSITION OF A RADIATING POINT SOURCE AND METHOD OF EMPLOYING

This application is a continuation-in-part of application Ser. No. 10/073,335, filed on Feb. 13, 2002 now U.S. Pat. No. 7,027,634.

BACKGROUND OF THE INVENTION

The present invention relates to methods of employing an optical system for determining the angular position of a radiating point source as well as the system itself. The disclosure of the parent application identified above is hereby incorporated by reference herein. In the present invention, radiation from a point source travels through a mask and onto the surface of a sensor. In the prior art, this general concept is well known, however, the prior art fails to teach or suggest the specific techniques employed by Applicant to accurately measure angular position and distance using such a structure.

Prior art systems have used masked or coded apertures placed above multi-element detectors. All of these techniques have attempted to determine the position of a projected pattern on a detector surface by comparing signals from fixed detector elements arranged in a unique pattern or from comparison to fixed reference signals previously stored in a computer.

The present invention employs a transmissivity mask with a plurality of sinusoids of different scale to achieve high image detection resolution, and corresponding high angular resolution.

The following prior art is known to Applicant:

U.S. Pat. Nos. 4,193,689 and 4,314,761, both to Reymond et al. disclose arrangements for locating radiating point sources including the use of a single axis detector array and an aperture mask containing a slit to project light onto the array. In the earlier patent, a cylinder lens is used, and in the later patent, the cylinder lens is replaced with an aperture that can be shuttered to allow light in from preferred directions. In each case, three single axis arrays are used, and three cameras are required to compute three planes that intersect to define a point in space. The embodiments of the present invention differ from the teachings of the Reymond et al. patents since they include computing means to determine scales and shifts of image components and wherein the mask does not include a single slit.

U.S. Pat. No. 4,209,780 to Fenimore et al. and U.S. Pat. No. 4,389,633 to Fenimore disclose the technique of using uniformly redundant arrays for coded aperture imaging. Correlation between mask and image is used to determine a lag function of the received mask pattern. A mosaic pattern is disclosed as yielding results superior to those yielded through the use of a random array. In the Fenimore '633 patent, the mask and detector are either one or two dimensional. The Fenimore '780 patent only discloses two dimensional imaging. The present invention differs from the teachings of the Fenimore patents since it does not compare an image to a fixed reference pattern.

U.S. Pat. No. 4,435,838 to Gourlay discloses the concept of imaging planes of various distances in the field of tomographic imaging. The Gourlay technique improves the prior art process of selecting various image sizes to correlate with detector response to select a particular depth plane. Gourlay teaches the setting of a coded aperture at a distance D/d, where D is the object-to-detector distance and d is the object-to-mask distance, so that the image can be kept at the same magnification, thereby simplifying the correlation process. The present invention differs from the teachings of Gourlay and other prior art systems in the field of tomographic imaging, since, in the present invention, various object-to-mask distances or various image sizes are not chosen to select a particular depth, but, instead, the mask image scale is automatically determined using frequency domain techniques.

Applicant is also aware of U.S. Pat. No. 5,408,323 to Mitchelson and U.S. Pat. No. 6,141,104 to Schulz. Each of these references teaches the concept of the use of a random pattern mask or universal redundant array. In each of these patents, measurement is conducted by comparing actual measurements to previously stored reference measurements. Over and above the reasons why the present invention, in its embodiments, patentably distinguishes from the Reymond et al. patents, the present invention distinguishes from Fenimore, Mitchelson, Gourlay and Schulz as specifically avoiding comparison of actual measurements to reference measurements.

SUMMARY OF THE INVENTION

The present invention relates to methods of employing an optical system for determining angular position of a radiating point source as well as the system itself. The present invention includes the following interrelated objects, aspects and features:

(1) The present invention is disclosed in terms of a preferred embodiment, in which a transmissivity mask is located at a distance from a linear array comprising a detector surface. The transmissivity mask consists of a plurality of frequencies varying in one dimension, e.g., in the Y-axis. A point radiating source illuminates the mask to cast an image onto the array. Computing means are employed to identify phases of said plurality of frequencies to determine the image scale and shift along the detector array axis.

(2) Measurement of the phase of the lowest frequency component is used to determine a coarse position measurement and is also used to measure the particular cycle of the next higher frequency component. In the same manner, the phase of the next higher frequency component is used to determine the detector position to a finer degree. As before, at the same time, the next higher frequency component is also used to determine the particular cycle of the next higher frequency component as the measurements become finer and more accurate consecutively.

(3) Eventually, the exact pattern shift is determined and from this information, the angle of incidence between the point source of radiation and the detector is determined.

(4) One example of a mask pattern contains three frequencies, including the fundamental frequency $f_0$, $f_1 = 5*f_0$, $f_2 = 25*f_0$. The mask length is longer than the detector to ensure that the detector is fully covered by the pattern for all source positions. The phase determination of each of the frequency components allows resolving to finer and finer degrees as with a vernier caliper.

(5) A convenient mathematical encryption of the spectral frequency and phase data (without using the final interpolation routine) uses a 3 digit number (base 5), where each digit defines one of five 72° positions for that spectral component. The MSB ($Nf_0$) corresponds to the fundamental frequency and the LSB ($Nf_2$) corresponds to the highest frequency component. Using $f_0$ to represent the mask image fundamental period, the pattern position ($Y_m$) is calculated as:

$$Y_m = [(N_{f0}*25 + N_{f1}*5 + N_{f2})/(125*f_0)]$$

The interpolated residual of the $f_2$ phase is included in this result to give a more accurate position along the detector surface.

The angle of incidence between mask and detector is determined from the mask to detector height $X_m$ and the mask position by:

$$\Theta_r = a\tan\left(\frac{Y_m}{X_m}\right)$$

(6) The present invention differs from the invention disclosed in the parent application. The parent application discloses use of a linear detector array wherein optical data is read in a sequential manner. The present invention does not employ such an array. Instead, a patterned detector array is employed which, in the preferred embodiment, consists of three separate and parallel arrays that each decode one phase of a particular mask image frequency.

(7) In the preferred embodiment of the present invention, three mask transmission frequencies are identified, a fundamental frequency ($F_0$), a mid-frequency ($5F_0$) and a high frequency ($25F_0$). Each of the three detector arrays, in the preferred embodiment, consists of only five photodetector elements.

(8) The coarse array consists of five equally spaced detector elements. This array decodes the fundamental frequency $F_0$ by sampling five separate phase points of the fundamental image frequency. The mid-frequency detector array also has five groups each with five interleaved and sequential detector elements that sample five separate phase points of the five mid-frequency mask image cycles. Similarly, the high frequency array consists of five groups of 25 interleaved and connected detector elements that sample five separate phase points of the 25 high frequency mask image cycles.

(9) In the preferred embodiment, the arrangement of five sample points per cycle, every 72 degrees, is sufficient to measure phase accurately and without sensing other image frequencies. For example, the mid-frequency detector is not sensitive to the fundamental or high frequency mask image. In effect, the array computes the frequency spectrum at three distinct frequency points $F_0$, $5F_0$ and $25F_0$.

(10) To reduce aliasing to a negligible level, the critical high frequency phase detection array is "windowed" by shaping the pixels according to a Hann window function. This window function is necessary to facilitate achievement of best accuracy. The functions of the $F_0$ and $5F_0$ arrays are merely to establish a coarse or medium resolution position, while the final accuracy of the detector is determined by the high frequency array.

(11) A unique aspect of the present invention is that it permits parallel image processing of a relatively low number of channels. As such, signal modulation can be employed to reduce the susceptibility to optical or electromagnetic interference. This is a particularly important attribute in severe environments such as are found in jet cockpits where the full sun interference causes problems with conventional optical systems. In the preferred embodiment of the present invention, modulation of 100 Khz is employed so that the system can operate even when facing the sun.

As such, it is a first object of the present invention to provide an optical system for determining the angular position of a radiating point source and the method of employing it.

It is a further object of the present invention to provide such a system in which a transmissivity mask is located at a distance from a linear array detector and interposed between the linear array detector and a point source of radiation.

It is a still further object of the present invention to use a refractive window between said mask and detector to lesson the angle of incidence upon the detector and associated effects of diffraction and reflection.

It is a still further object of the present invention to provide such a system, which permits actual measurements of angular position and distance of a radiating point source from a detector without resort to comparison with reference data.

It is a yet further object of the present invention to provide such a system and method in which multiple single frequency components and phase methodology are employed in the measuring process.

It is a further object of the present invention to provide such a system in which three mask transmission frequencies are identified and provide coarse and fine measurement.

It is a still further object of the present invention to provide such a system in which sufficient sample points are employed to facilitate accurate measurement of phase while avoiding the sensing of other image frequencies.

It is a still further object of the present invention to provide such a system in which the detector may, if desired, include multiple, coplanar but orthogonal, active areas.

It is a still further object of the present invention to provide such a system applicable to the environment of an aircraft cockpit having a substantially transparent canopy.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

A first embodiment of the present invention is disclosed in detail with reference to FIGS. 1-11. A primary aspect of the first embodiment 10 of the present invention describes a method for determining the angular position of a point source of radiation 11 with respect to a detector 15 by examining the phases of periodic components of the projected image of a variable transmissivity mask 13. The preferred embodiment encodes the transmissivity mask with several frequencies that have logarithmic separations and measures the phases of said frequencies received by the detector.

With reference to FIGS. 1-4, the configuration of the system used to practice the method is seen.

Figure 1:
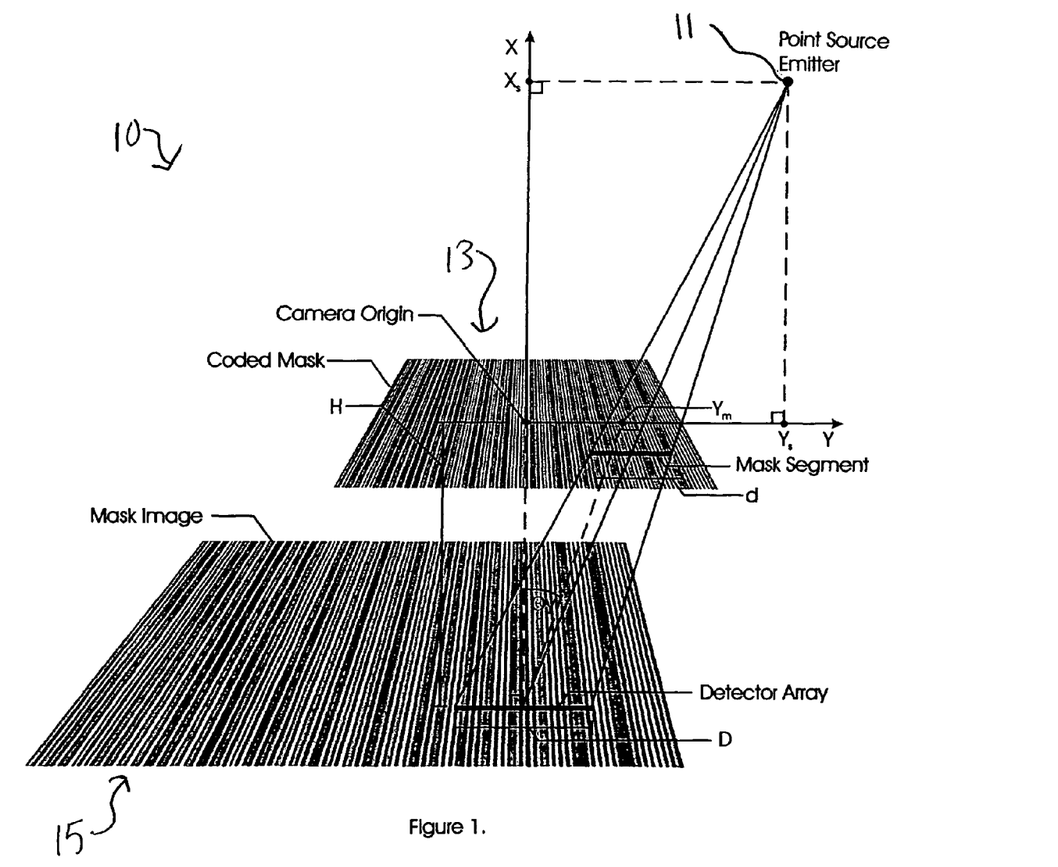
FIG. 1 shows a schematic perspective representation of the spatial relationship between a point source of radiation, a window mask pattern, and a detector.
Figure 2:
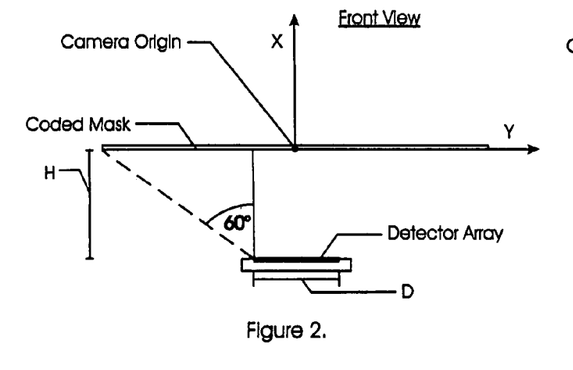
FIG. 2 shows a front view of the FIG. 1 representation.
Figure 3:
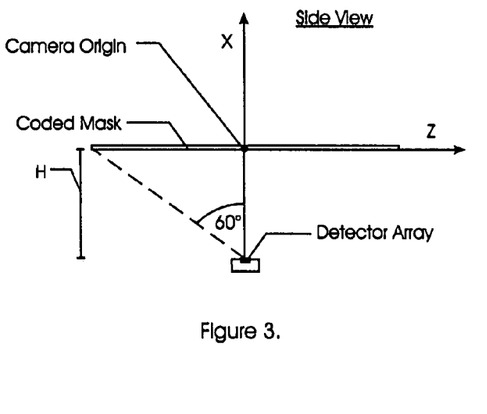
FIG. 3 shows a side view of the FIG. 1 representation.
Figure 4:
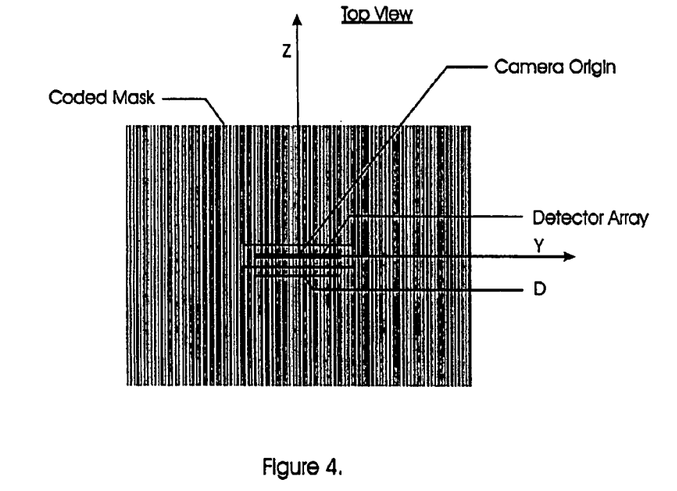
FIG. 4 shows a top view of the FIG. 1 representation.
Figure 5:
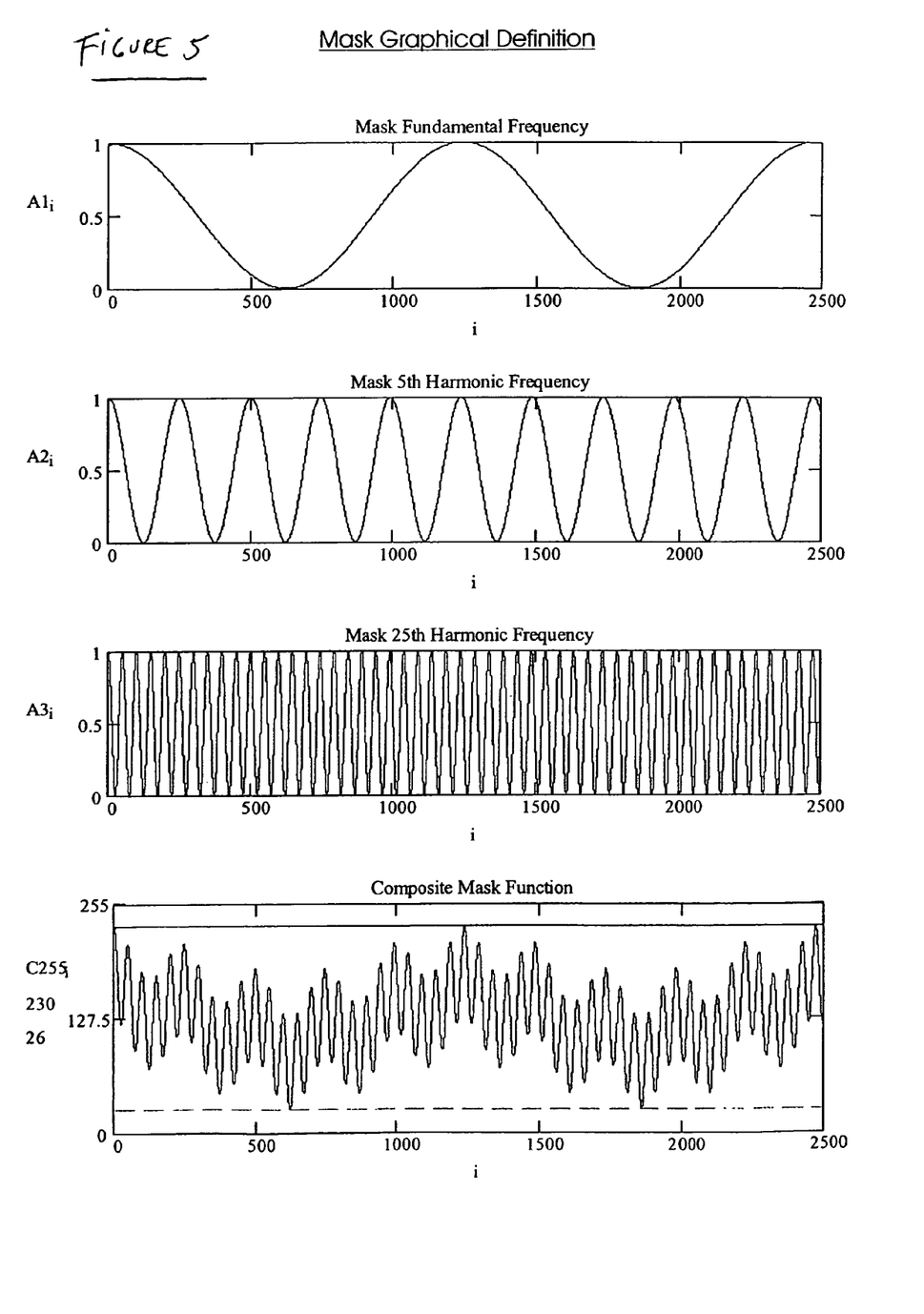
FIG. 5 shows graphical representations of an analog mask pattern for a first embodiment of the present invention.
Figure 6:
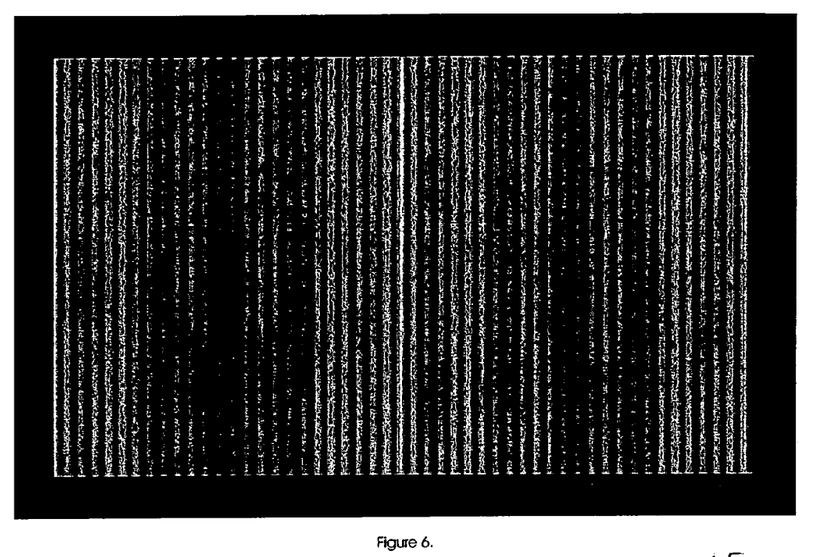
FIG. 6 shows an enlarged gray scale image of the mask transmissivity function.

The mask image fundamental period ($1/f_0$) is made about 1.2% smaller than the detector length (D) to allow for 1.2% magnification at the nominal operating distance of 0.5 meter. FIG. 5 shows a graphical representation of the constituent mask frequencies f0, 5f0, and 25f0, as well as a graph of the composite function. FIG. 6 shows an enlargement of the transmissivity mask image of the mask 13. The transmissivity mask is defined by the following equation:

$$T(x) = \frac{\sum \cos(2\pi f_0 x) + \cos(2\pi 5 f_0 x) + 2\cos(2\pi 25 f_0 x)}{8} + 0.5$$

$$f_0 = \frac{1.012}{D}$$

Figure 7:
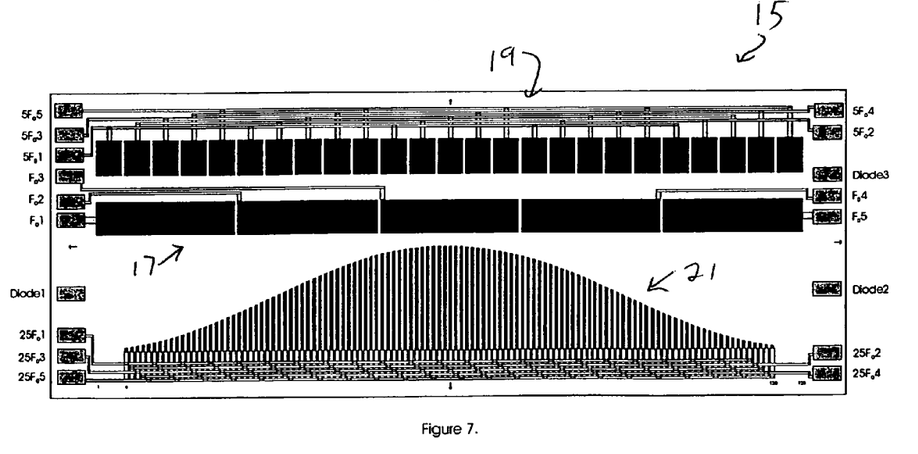
FIG. 7 shows the detector array used to measure the phase of the mask image.
Figure 8:
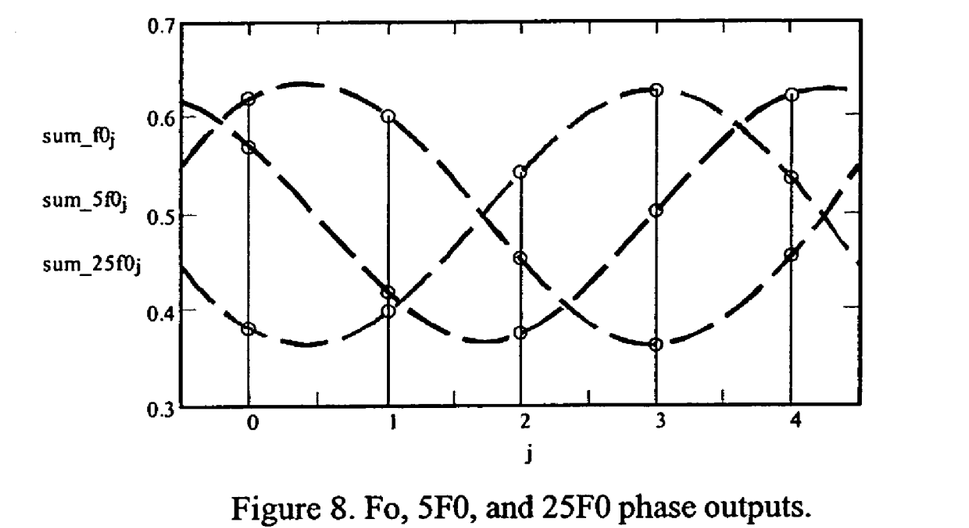
FIG. 8 shows an example of the three detector output signals.
Figure 9:
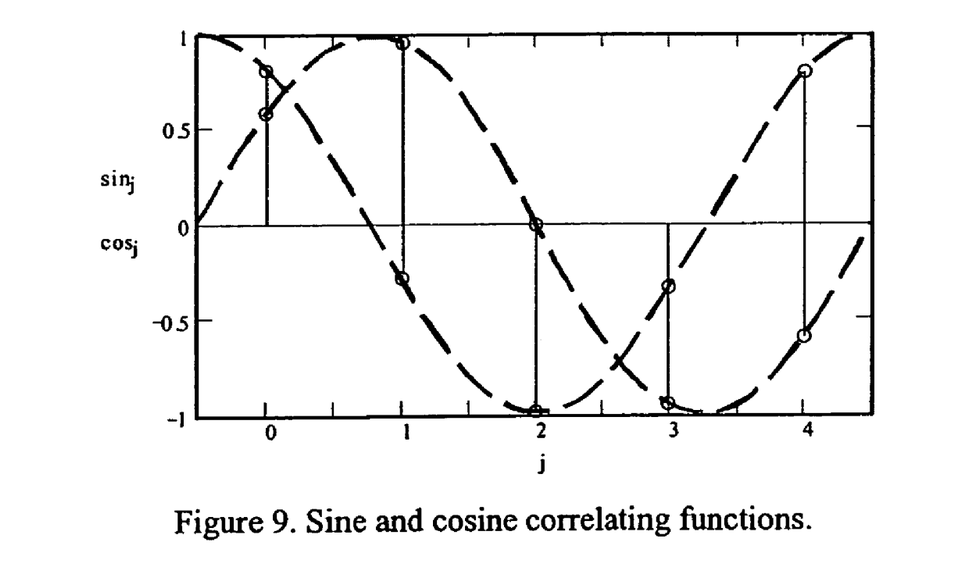
FIG. 9 shows the correlating functions used to determine detector signal phases.
Figure 10:
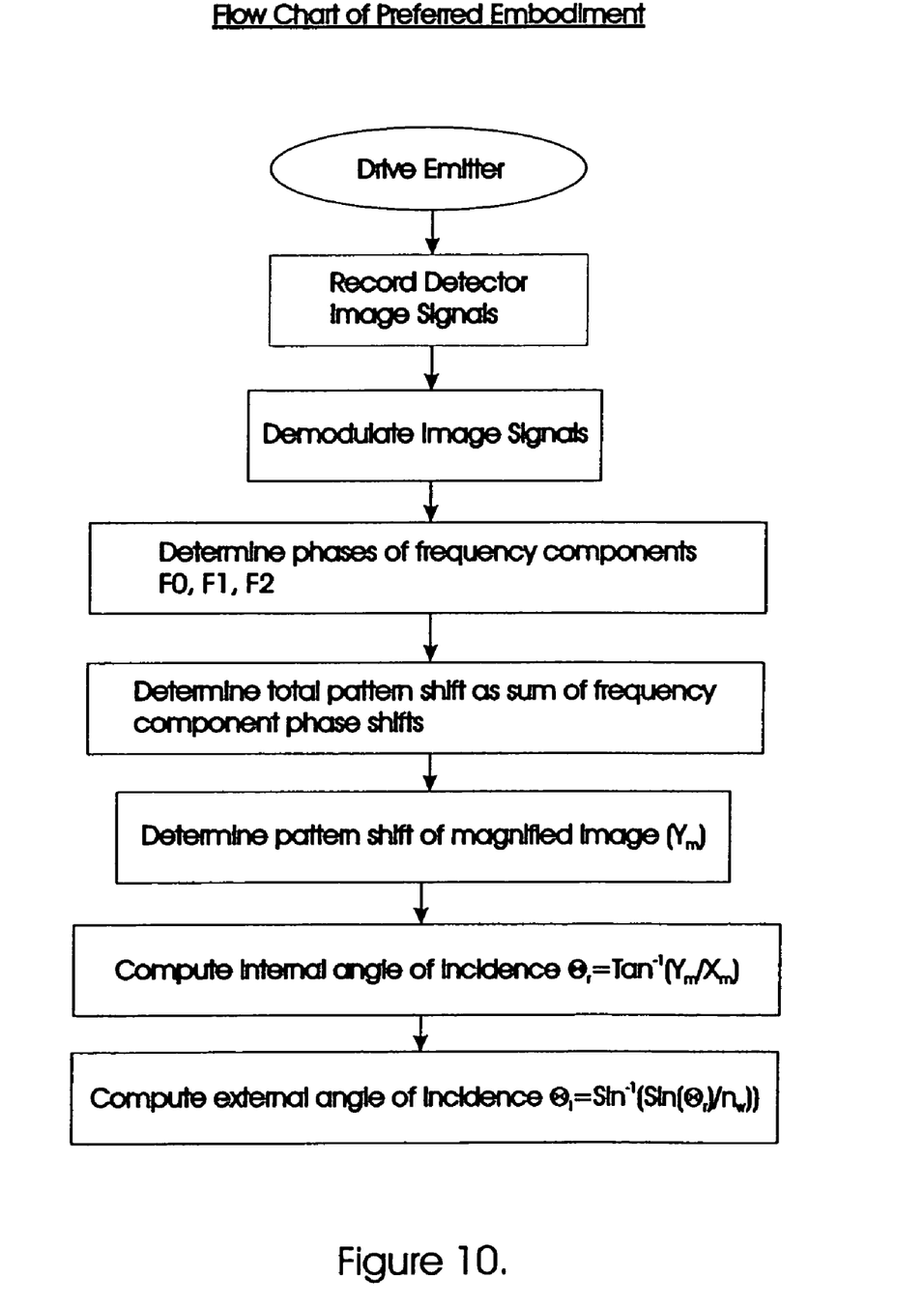
FIG. 10 shows a flowchart of operation of the preferred embodiment.
Figure 11:
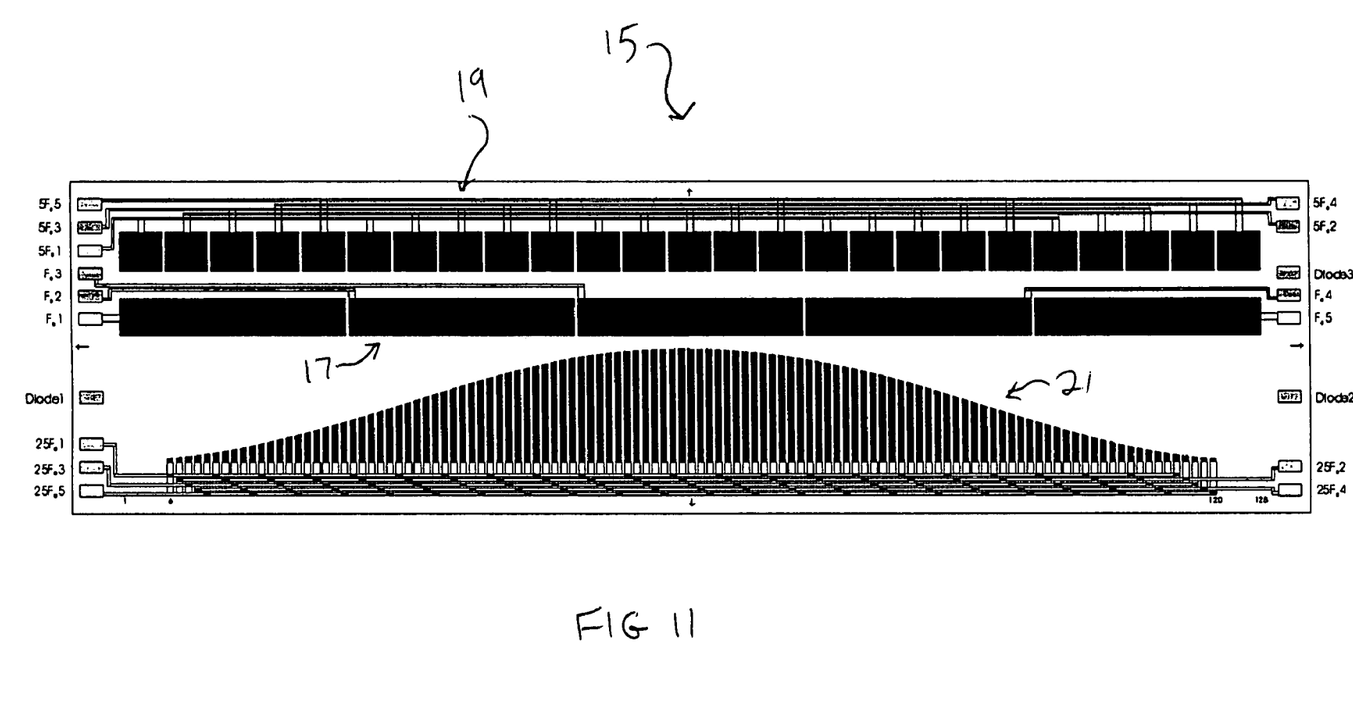
FIG. 11 shows an enlarged view of the detector array illustrated in FIG. 7.

The detector 15 is shown in FIGS. 7 and 11 and comprises three arrays 17, 19 and 21 with element spacing to detect the fundamental frequency (f0), the fifth harmonic (5f0), and the $25^{th}$ harmonic (25f0), respectively. The arrays are situated adjacent one another, since the image is one-dimensional and the same optical encoded signal is imaged on each array. It should be noted that, in the preferred embodiment, each array has only five outputs each that sample the sinusoid in five equally separated positions or phases in the sine wave images. In the case of the fifth and $25^{th}$ harmonic detector arrays, every fifth element is connected in parallel, resulting in the summation of similar phase locations from numerous cycles along the wave train image. The fifth harmonic detector array samples five cycles, while the $25^{th}$ harmonic detector array samples 25 cycles. Each detector array is the same overall length (D).

An important feature of the detector array is the window function applied to the high frequency pixels (25F0). This is required to prevent aliasing particularly at image magnifications other than unity, which occur at distances other than 0.5 meters. The final accuracy is reliant on the phase measurement of the high frequency. The window function is not needed for the lower frequencies, since it does not improve phase accuracy.

Another aspect of the preferred embodiment is to make the detector array pixels sufficiently large as to minimize shot noise due to harsh optical conditions, such as found in the jet cockpit environment. The detector array pixels are in the order of 1 mm in length versus the typical integrated array pixel lengths of 10 um. The 100:1 increase in pixel size allows reduction of shot noise by the square root of the area ratio, or about 10 times.

Another benefit of the larger pixels is the reduction in laser speckle, should a laser be used as a source of emission. Also, the effects of dust and scratches in the optical surfaces are lessened.

An equally important aspect of this embodiment is the parallel output of detector signals, which allows for signal modulation, thereby eliminating any sensitivity to sun ambient and other forms of lighting interference. The signal is modulated at 100 KHz typically to provide this ambient light immunity.

Another aspect of the preferred embodiment is the use of a refractive medium between mask and detector plane such as fused Silica (Quartz), allowing great stability of the image forming region, and greatly reducing the effects of diffraction at incident angles up to ±60°.

The component phases are computed using the equations below. For the fundamental frequency phase:

$$\Theta_{f0} = a\tan\left[\frac{\sum_{j=1}^{5} \text{Channel\_F0}_j * \sin(2\pi j/5)}{\sum_{j=1}^{5} \text{Channel\_F0}_j * \cos(2\pi j/5)}\right],$$

$$\sum_{j=1}^{5} \text{Channel\_F0}_j * \cos(2\pi j/5) \geq 0$$

$$\Theta_{f0} = a\tan\left[\frac{\sum_{j=1}^{5} \text{Channel\_F0}_j * \sin(2\pi j/5)}{\sum_{j=1}^{5} \text{Channel\_F0}_j * \cos(2\pi j/5)}\right] + \pi,$$

$$\sum_{j=1}^{5} \text{Channel\_F0}_j * \cos(2\pi j/5) < 0, \sum_{j=1}^{5} \text{Channel\_F0}_j * \sin(2\pi j/5) \geq 0$$

$$\Theta_{f0} = a\tan\left[\frac{\sum_{j=1}^{5} \text{Channel\_F0}_j * \sin(2\pi j/5)}{\sum_{j=1}^{5} \text{Channel\_F0}_j * \cos(2\pi j/5)}\right] - \pi,$$

$$\sum_{j=1}^{5} \text{Channel\_F0}_j * \cos(2\pi j/5) < 0, \sum_{j=1}^{5} \text{Channel\_F0}_j * \sin(2\pi j/5) < 0$$

For the fifth harmonic phase:

$$\Theta_{5f0} = a\tan\left[\frac{\sum_{j=1}^{5} \text{Channel\_5F0}_j \cdot \sin(2\pi j/5)}{\sum_{j=1}^{5} \text{Channel\_5F0}_j \cdot \cos(2\pi j/5)}\right],$$

$$\sum_{j=1}^{5} \text{Channel\_5F0}_j \cdot \cos(2\pi j/5) \geq 0$$

-continued $$\Theta_{5f0} = a\tan\left[\frac{\sum_{j=1}^{5} \text{Channel\_5F0}_j \cdot \sin(2\pi j/5)}{\sum_{j=1}^{5} \text{Channel\_5F0}_j \cdot \cos(2\pi j/5)}\right] + \pi,$$

$$\sum_{j=1}^{5} \text{Channel\_5F0}_j \cdot \cos(2\pi j/5) < 0, \sum_{j=1}^{5} \text{Channel\_5F0}_j \cdot \sin(2\pi j/5) \geq 0$$

$$\Theta_{5f0} = a\tan\left[\frac{\sum_{j=1}^{5} \text{Channel\_5F0}_j \cdot \sin(2\pi j/5)}{\sum_{j=1}^{5} \text{Channel\_5F0}_j \cdot \cos(2\pi j/5)}\right] - \pi,$$

$$\sum_{j=1}^{5} \text{Channel\_5F0}_j \cdot \cos(2\pi j/5) < 0, \sum_{j=1}^{5} \text{Channel\_5F0}_j \cdot \sin(2\pi j/5) < 0$$

For the 25th harmonic phase:

$$\Theta_{25f0} = a\tan\left[\frac{\sum_{j=1}^{5} \text{Channel\_25F0}_j \cdot \sin(2\pi j/5)}{\sum_{j=1}^{5} \text{Channel\_25F0}_j \cdot \cos(2\pi j/5)}\right],$$

$$\sum_{j=1}^{5} \text{Channel\_25F0}_j \cdot \cos(2\pi j/5) \geq 0$$

$$\Theta_{25f0} = a\tan\left[\frac{\sum_{j=1}^{5} \text{Channel\_25F0}_j \cdot \sin(2\pi j/5)}{\sum_{j=1}^{5} \text{Channel\_25F0}_j \cdot \cos(2\pi j/5)}\right] + \pi,$$

$$\sum_{j=1}^{5} \text{Channel\_25F0}_j \cdot \cos(2\pi j/5) < 0, \sum_{j=1}^{5} \text{Channel\_25F0}_j \cdot \sin(2\pi j/5) \geq 0$$

$$\Theta_{25f0} = a\tan\left[\frac{\sum_{j=1}^{5} \text{Channel\_25F0}_j \cdot \sin(2\pi j/5)}{\sum_{j=1}^{5} \text{Channel\_25F0}_j \cdot \cos(2\pi j/5)}\right] - \pi,$$

$$\sum_{j=1}^{5} \text{Channel\_25F0}_j \cdot \cos(2\pi j/5) < 0, \sum_{j=1}^{5} \text{Channel\_25F0}_j \cdot \sin(2\pi j/5) < 0$$

Using the fundamental frequency phase, the integer number of cycles of the mid frequency component is computed from the fundamental frequency phase by dividing the phase by 2PI/5 and truncating the remainder.

$$N_{f0} = \text{trunc}\left(\frac{\Theta_{f0}}{(2\pi/5)}\right), \Theta_{f0} \geq 0$$

$$N_{f0} = \text{trunc}\left(\frac{\Theta_{f0}}{(2\pi/5)} - 1\right), \Theta_{f0} < 0$$

Using the fifth harmonic phase, the integer number of cycles of the $25^{th}$ harmonic is computed is computed from the mid frequency phase by dividing the phase by 2PI/5 and truncating the remainder.

$$N_{5f0} = \text{trunc}\left(\frac{\Theta_{5f0}}{(2\pi/5)}\right), \Theta_{5f0} \geq 0$$

$$N_{5f0} = \text{trunc}\left(\frac{\Theta_{5f0}}{(2\pi/5)} - 1\right), \Theta_{5f0} < 0$$

The overall image displacement or shift is computed by combining the number of mid frequency cycles, high frequency cycles, and high frequency phase $$Y_m = \frac{N_{f0} \cdot 25 + N_{5f0} \cdot 5 + \frac{\Theta_{25f0}}{(2\pi/5)}}{125 \cdot f0}$$

From the image displacement (Ym), and mask height (Xm) the angle of incidence in the refractive window ($\theta_r$) is computed by $$\Theta_r = a\tan\left(\frac{Y_m}{X_m}\right)$$

The preferred embodiment uses a refractive medium or window between mask and detector, in which case the angle of incidence in the air path between emitter and mask surface ($\Theta_i$) is computed from the angle of refraction ($\Theta_r$) and the window index of refraction ($n_w$)

$$\Theta_i = a\sin\left(\frac{\sin\Theta_r}{n_w}\right)$$

Figure 12:
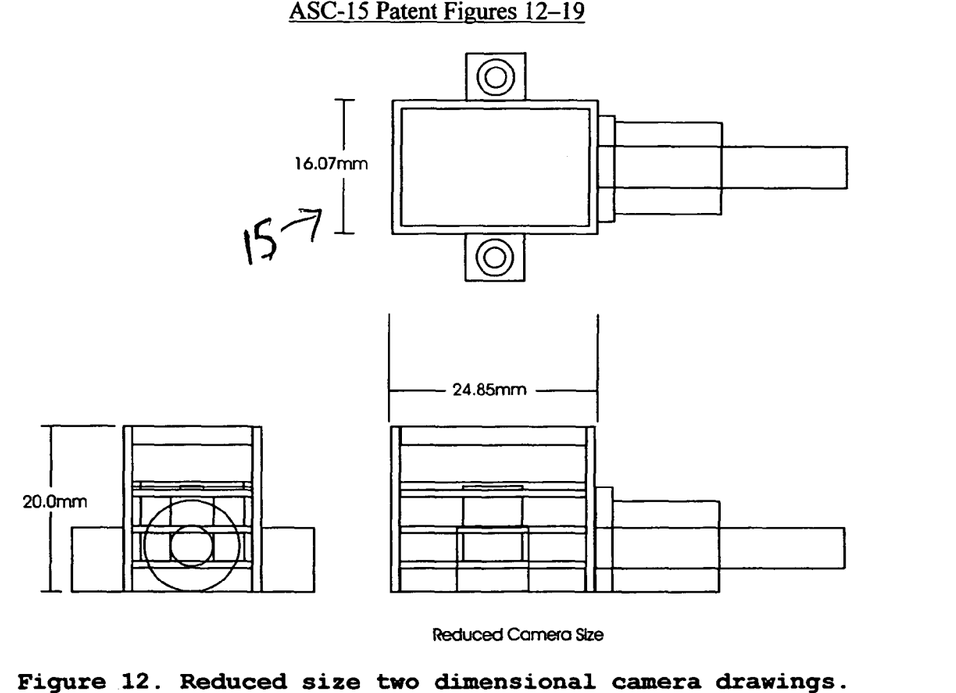
FIG. 12 shows a schematic representation of a two-dimensional angle of incidence embodiment of the present invention.
Figure 13:
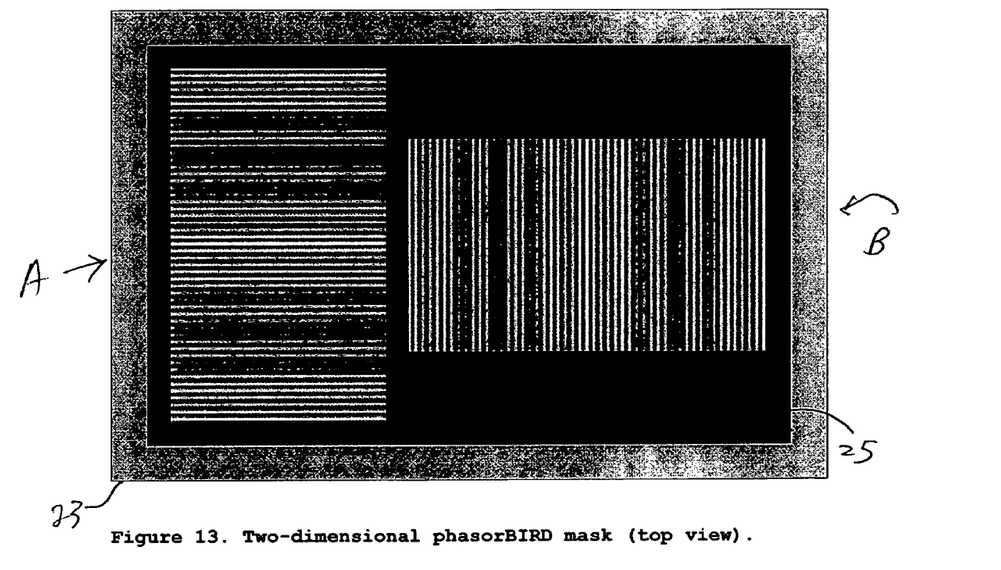
FIG. 13 shows a top view of the two-dimensional mask of the embodiment of FIG. 12.
Figure 14:
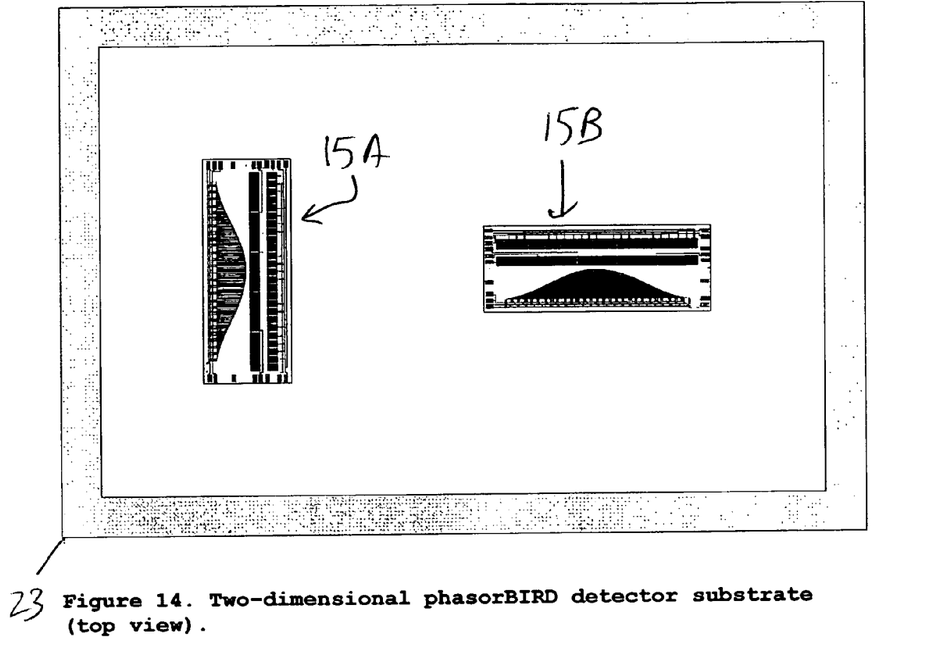
FIG. 14 shows a top view of a two-dimensional detector substrate.

A second embodiment of the present invention, with reference to FIGS. 12 and 13, comprises two pairs A and B of detectors 15 and masks 13 mounted in quadrature, using a common detector substrate 23 and common mask window 25 to allow two-dimensional sensing of the angle of incidence of an emitter. As clearly shown in FIG. 13, the two-dimensional mask consists of first and second mask regions that are orthogonal to one another and coplanar. As should be understood by those of ordinary skill in the art, correspondingly, the respective detectors are orthogonal to one another as well. FIG. 14 shows the detector substrate with two orthogonal and coplanar detectors 15A and 15B.

The advantage of this embodiment is the elimination of detector registration errors, in addition to sensor miniaturization, and the cost savings of using one mask, one detector substrate, one electronic circuit board, and one camera housing.

The number of processing channels per camera reduces from 15 to 5 making use of multiplexing the low and mid-frequency channels, since their update rates are not required to be as high as the high-frequency channel.

The two-dimensional sensor size is approximately 25 mm L×16 mm H×8.5 mm H, and the camera housing size is approximately 25 mm L×16 mm W×20 mm H.

With reference to FIGS. 15-19, a third embodiment of the present invention may be used to track movements of a pilot's head within a helmet 30 within the cockpit 31 of, for example, a jet aircraft. In this embodiment, the canopy 33 is employed as a filter to remove sunlight from the sun 35 within the bandwidth of the emitter and detector. In this third embodiment, the canopy filter may be used in conjunction with any radiation-based position and orientation measuring and display system.

Figure 15:
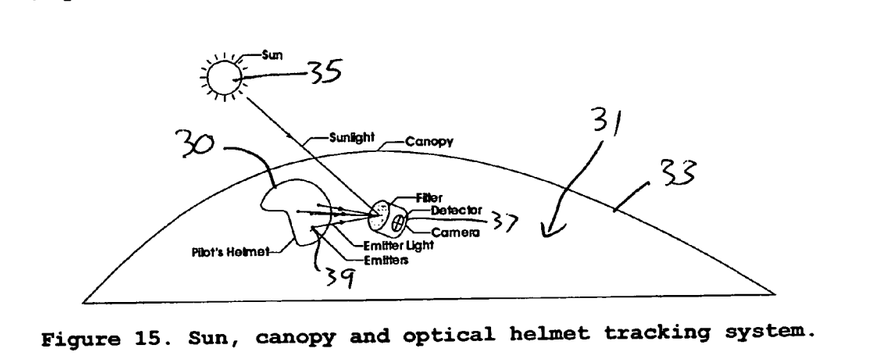
FIG. 15 shows a drawing of jet canopy with optical tracking system and sun interference.

FIG. 15 shows the configuration of a jet canopy 33 enclosing an optical helmet tracker system. The camera's detector 37 measures light from a plurality of helmet-mounted emitters 39 to measure helmet position and orientation. Sunlight from the sun 35 also enters the camera pupil, causing interference and saturation of measurement signals.

Figure 16:
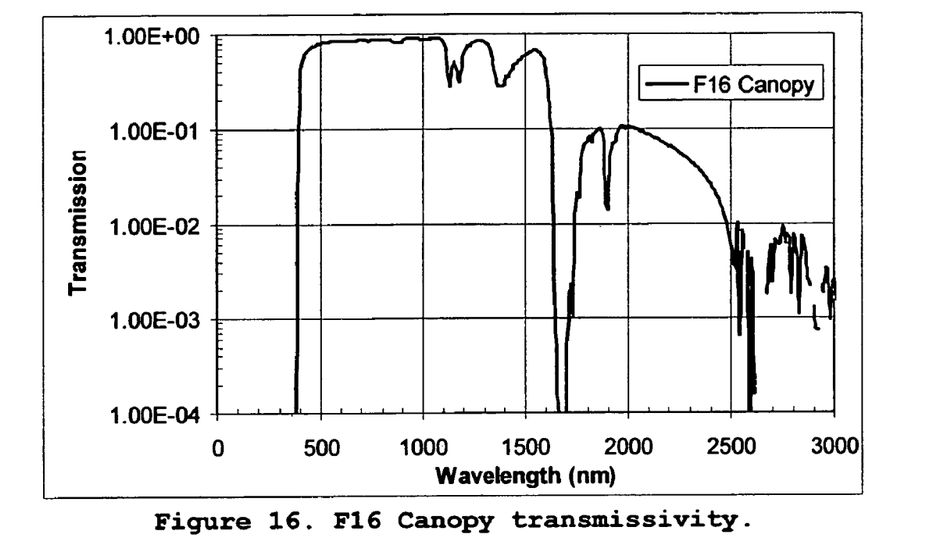
FIG. 16 shows a graph of light transmission versus wavelength for a third embodiment of the present invention consisting of an application in the cockpit of a jet aircraft.
Figure 17:
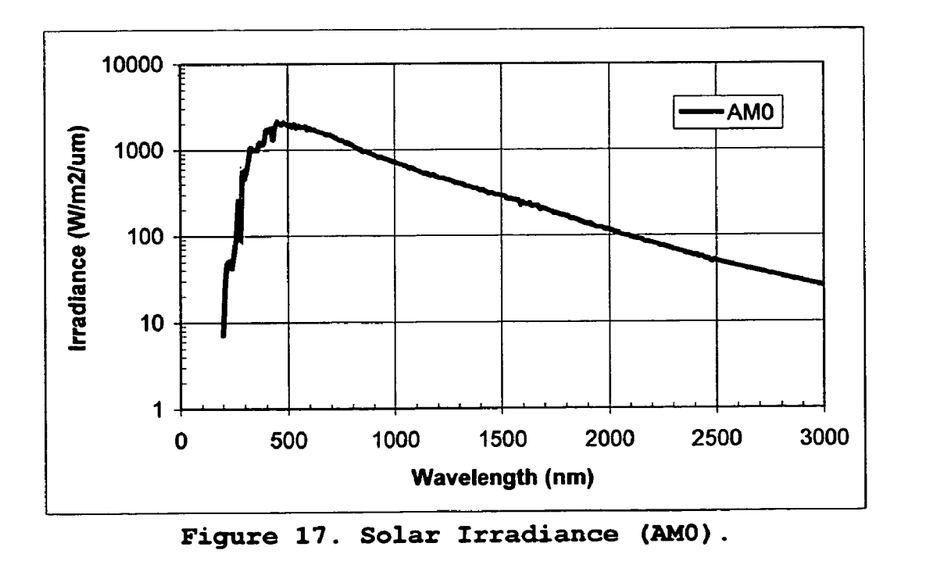
FIG. 17 shows a graph of solar irradiance versus wavelength for the third embodiment of the present invention.
Figure 18:
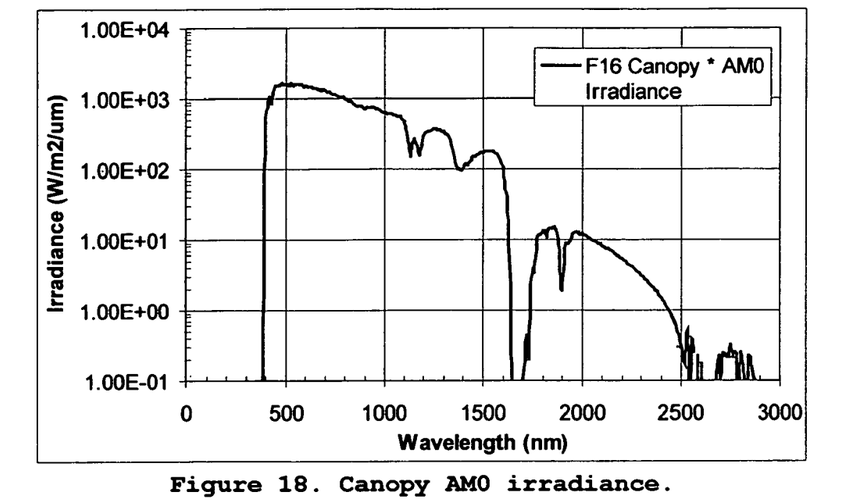
FIG. 18 shows a graph of canopy irradiance versus wavelength for the third embodiment of the present invention.

Tests of jet canopies show certain regions that have very little transmissivity, in particular, the ultraviolet region ($\lambda$<400 nm), and the infrared region ($\lambda$>1700 nm). FIG. 16 shows a typical canopy transmissivity curve (F16 canopy). FIG. 17 shows the sun irradiance spectrum (air mass zero), which is an approximate irradiance encountered at flying altitude. FIG. 18 shows the sun irradiance spectrum as filtered by the jet canopy curve of FIG. 16.

The preferred design of this embodiment uses the canopy filter characteristics as one filter to attenuate a portion of the spectrum that overlaps the signal spectrum, and another filter directly covering the detector and filtering sunlight while permitting radiation from the light source 39 to pass therethrough. For applications requiring an ultraviolet emitter, an ultraviolet filter is placed over the detector to accept the emitter spectrum, but reject the portion of sunlight that the canopy transmits.

Figure 19:
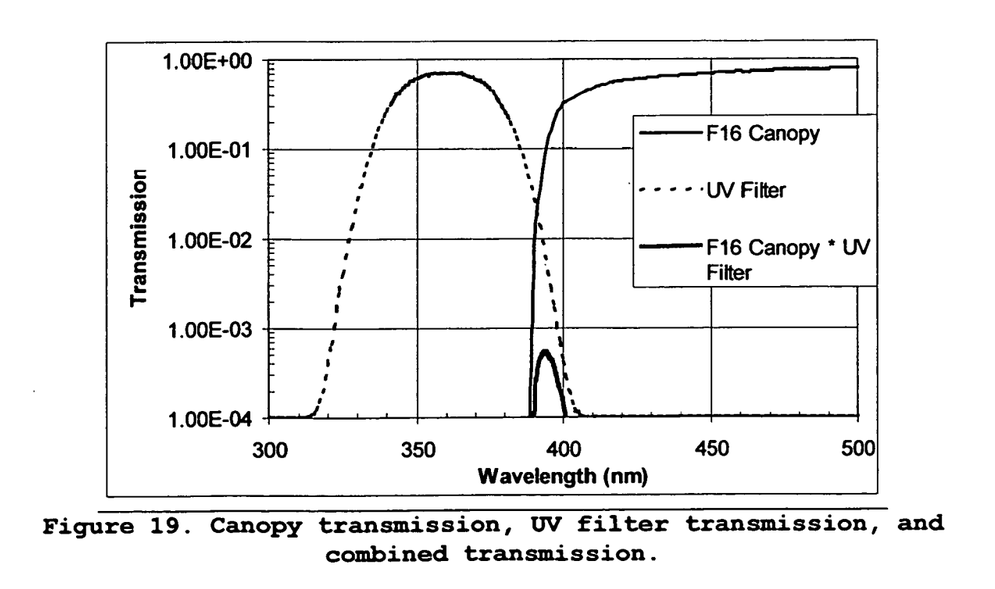
FIG. 19 shows a graph of canopy transmission, UV filter transmission, and combined transmission.

FIG. 19 shows the spectral transmission curve for a UV band-pass filter, the canopy transmission curve, and the combined transmission curve. The UV filter placed over the optical detector allows almost full transmission of the UV signal, while sunlight must pass through both canopy and UV filter, being attenuated by three orders of magnitude, and having a bandwidth reduced to less than 20 nm. The invention effectively eliminates any sunlight interference, which has been the bane of optical systems in the jet cockpit environment.

As such, an invention has been disclosed in terms of preferred embodiments that fulfill each and every one of the objects of the invention as set forth above, and provide a new and useful method of employing a range adaptable system for determining the angular position and distance of a radiating point source, of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A system for determining the angular position and distance of a radiating source with respect to a detector, comprising:
   a) a radiation detector;
   b) a mask spaced in front of said detector, said mask having a plurality of transmission frequencies;
   c) recording means for recording an image cast onto said detector by radiation passing through said mask;
   d) computing means for computing data related to said image;
   e) identifying means for identifying phases of a plurality of frequencies of said image and creating signals corresponding thereto;
   f) determining means for determining angular position of said radiation source with respect to said detector;
   g) said determining means receiving said signals and, therefrom, determining said angular position of said radiation source with respect to said detector.

2. The system of claim 1, wherein apertures in said mask comprise a transmissivity pattern varying in one dimension.

3. The system of claim 2, wherein said one dimension comprises a Y-axis.

4. The system of claim 1, wherein said detector and mask are planar and lie in parallel planes.

5. The system of claim 4, wherein said mask and detector are spaced apart by a known distance.

6. The system of claim 1, wherein said mask is spaced from said detector by a refractive medium or window.

7. The system of claim 1, wherein said detector includes a plurality of parallel arrays, each array detecting phase of a unique mask frequency.

8. The system of claim 7, wherein there are three mask frequencies related to one another by the ratio $F_0:5F_0:25F_0$, where $F_0$ is a fundamental frequency.

9. The system of claim 8, wherein an array of said detector detects phase of said fundamental frequency and provides coarse measurement.

10. The system of claim 9, wherein an array of said detector detects phase of said frequency $25F_0$ and provides fine measurement.

11. The system of claim 1, wherein said detector includes a plurality of parallel detector arrays for identifying said phases.

12. The system of claim 11, wherein said plurality parallel detector arrays consist of a coarse, medium, and fine resolution array each responsive to phases of a particular mask image frequency.

13. The system of claim 1, wherein two orthogonal and coplanar arrangements of masks are used on a common window and two underlying orthogonal and coplanar detectors are located on a common substrate to create a two-dimensional angle of incidence sensor.

14. The system of claim 1, located within an aircraft cockpit.

15. The system of claim 14, wherein said aircraft comprises a jet.

16. The system of claim 15, wherein said jet aircraft has a canopy that filters a portion of light spectrum including an optical detection bandwidth.

17. The system of claim 16, wherein said optical detection bandwidth comprises a combined response of an optical detector bandwidth and an overlying detector filter bandwidth.

18. The system of claim 17, wherein said optical detection bandwidth includes an ultraviolet range and uses a detector filter that removes light above a wavelength of 400 nm.

19. The system of claim 17, wherein said optical detection bandwidth includes an infrared range and uses a detector filter that removes light below a wavelength of 1700 nm.

20. The system of claim 1, employing a plurality of detectors that detect emitter light angle of incidence in at least one dimension.

21. A system for determining the angular position and distance of a radiating source with respect to a detector, comprising:
   a) a radiation detector, said detector including a plurality of parallel arrays, each array detecting phase of a unique mask frequency;
   b) a mask spaced in front of said detector, said mask having a plurality of transmission frequencies, said mask having apertures comprising a transmissivity pattern varying in one dimension, said mask and detector each being planar and lying in parallel planes;

c) recording means for recording an image cast onto said detector by radiation passing through said mask;

d) computing means for computing data related to said image;

e) identifying means for identifying phases of a plurality of frequencies of said image and creating signals corresponding thereto;

f) determining means for determining angular position of said radiation source with respect to said detector;

g) said determining means receiving said signals and, therefrom, determining said angular position of said radiation source with respect to said detector.

22. The system of claim 21, wherein said mask and detector are spaced apart by a known distance.

23. The system of claim 21, wherein said mask is spaced from said detector by a refractive medium or window.

24. The system of claim 21, wherein there are three mask frequencies related to one another by the ratio $F_0:5F_0:25F_0$, where $F_0$ is a fundamental frequency.

25. The system of claim 24, wherein a first array of said detector detects phase of said fundamental frequency and provides coarse measurement and a second array of said detector detects phase of said frequency $25F_0$ and provides fine measurement.

26. The system of claim 21, wherein said plurality parallel detector arrays consist of a coarse, medium, and fine resolution array each responsive to phases of a particular mask image frequency.

27. The system of claim 21, wherein two orthogonal and coplanar arrangements of masks are used on a common window and two underlying orthogonal and coplanar detectors are located on a common substrate to create a two-dimensional angle of incidence sensor.

28. The system of claim 21, located within a jet aircraft cockpit.

29. The system of claim 28, wherein said jet aircraft has a canopy that filters a portion of light spectrum including an optical detection bandwidth.

30. The system of claim 29, wherein said optical detection bandwidth comprises a combined response of an optical detector bandwidth and an overlying detector filter bandwidth.

31. The system of claim 30, wherein said optical detection bandwidth includes an ultraviolet range and uses a detector filter that removes light above a wavelength of 400 nm.

32. The system of claim 31, wherein said optical detection bandwidth further includes an infrared range and uses a detector filter that removes light below a wavelength of 1700 nm.

* * * * *